(12) United States Patent
Seelam et al.

(10) Patent No.: US 8,099,565 B2
(45) Date of Patent: Jan. 17, 2012

(54) METHODS AND DEVICES FOR DETERMINING QUALITY OF SERVICES OF STORAGE SYSTEMS

(75) Inventors: Seetharami R. Seelam, Yorktown Heights, NY (US); Patricia J. Teller, Las Cruces, NM (US)

(73) Assignee: The Board of Regents of the University of Texas System, Austin, TX (US)

(*) Notice: Subject to any disclaimer, the term of this patent is extended or adjusted under 35 U.S.C. 154(b) by 882 days.

(21) Appl. No.: 12/054,598

(22) Filed: Mar. 25, 2008

(65) Prior Publication Data

US 2008/0244209 A1 Oct. 2, 2008

Related U.S. Application Data

(60) Provisional application No. 60/920,463, filed on Mar. 27, 2007.

(51) Int. Cl.
*G06F 12/00* (2006.01)

(52) U.S. Cl. ............... 711/154; 711/118; 711/E12.017
(58) Field of Classification Search ....................... None
See application file for complete search history.

(56) References Cited

U.S. PATENT DOCUMENTS

| 5,712,988 | A | * | 1/1998 | Khaira ........................... 710/113 |
| 5,920,701 | A | * | 7/1999 | Miller et al. .................. 709/228 |
| 6,715,006 | B1 | * | 3/2004 | Hotta et al. ..................... 710/45 |
| 6,914,881 | B1 | * | 7/2005 | Mansfield et al. ............ 370/230 |

OTHER PUBLICATIONS

"Towards Dynamic Adaptation of I/O Scheduling," oral presentation materials provided by Seetharami Seelam during employment interview, Mar. 20, 2006.

* cited by examiner

*Primary Examiner* — Reginald Bragdon
*Assistant Examiner* — Aracelis Ruiz
(74) *Attorney, Agent, or Firm* — Fulbright & Jaworski L.L.P.

(57) ABSTRACT

Methods and systems for allowing access to computer storage systems. Multiple requests from multiple applications can be received and processed efficiently to allow traffic from multiple customers to access the storage system concurrently.

10 Claims, 5 Drawing Sheets

METHODS AND DEVICES FOR DETERMINING QUALITY OF SERVICES OF STORAGE SYSTEMS

CROSS-REFERENCE TO RELATED APPLICATIONS

This application claims priority to U.S. Provisional Patent Application Ser. No. 60/920,463, filed Mar. 27, 2007, the entire contents of which are expressly incorporated herein by reference.

This invention was made with government support under contract number DE-FG02-04ER25622 awarded by the U.S. Department of Energy. The government has certain rights in the invention.

BACKGROUND OF THE INVENTION

1. Field of the Invention

The present invention relates generally to computer storage systems and more particularly, to providing storage service and associated service sharing methods that allow traffic from multiple customers to access the storage system concurrently. The methods proposed and the apparatus of the present invention provide quality of service in terms of latency, bandwidth, and service time for workloads from the customers.

2. Description of Related Art

Over time, computer systems, operating systems, and storage systems are required to service multiple applications concurrently. To provide sharing, a storage system also can be concurrently accessed by multiple computer systems each with multiple applications. Storage systems provide input/output (I/O) services to the applications. These applications typically have different data-delivery requirements; some require immediate response, some require a certain amount of storage bandwidth in a time window, and some require fair sharing of service time. Applications split their I/O needs into requests. These requests are transported from the application to the storage system. The storage system keeps the incoming requests in a queue and services them using a scheduling algorithm. There are algorithms that have been developed for I/O request scheduling but no algorithm has been able to satisfy the differing requirements of multiple applications simultaneously.

For example, interactive applications such as LATEX-editing require shorter average response times for their requests, real-time applications such as podcast audio require bounded latencies for their requests, and throughput-intensive applications such as data transfers and HPC applications require high bandwidth across multiple requests. Ever since the invention of movable disk heads, a plethora of algorithms have been developed to satisfy the different data-delivery requirements of applications, however, no single I/O scheduler is likely to be able to satisfy the requirements simultaneously.

One solution is to provide multiple algorithms, each satisfying a different data-delivery requirement, and mechanisms to activate one of these algorithms as needed by the applications. Linux versions 2.6.11 and above follows a similar approach. This solves only a special case of the original problem, i.e., when a single application with one requirement is accessing a storage resource, an appropriate scheduler can be activated. When there are multiple applications with different data-delivery requirements that are executing concurrently, it is not clear how the appropriate algorithms are selected. So, the Linux solution does not solve the original problem, i.e., simultaneously servicing multiple applications with different data-delivery requirements.

Server consolidation and virtualization of I/O systems, which will be pervasive in future systems, compound the original problem because they will provide service to many more applications with even more diverse data-delivery requirements. These two trends, although attractive for economic reasons, increase the diversity and complexity of applications sharing an I/O system, making it imperative to ensure that applications receive their share of I/O resources and the I/O performance to which they are entitled.

A possible extension to the Linux solution is to provide multiple algorithms and mechanisms so that applications can select algorithms that best suit their needs. However, this approach has a major problem that requires a nontrivial solution: when multiple applications, potentially using multiple schedulers, access the storage system, a mechanism is needed to control access to the storage system such that all applications get their fair share of the resource.

Schedulers for fair sharing of processor and network resources cannot be adapted for fair sharing of disk resources because of the fundamental differences between the resources. For instance, the relative order of request accesses to disk resources may impact disk utilization and fairness. However, such relative order has no impact on either processor or network resource utilization or fairness. While fair queuing and round-robin scheduling has been used extensively in sharing network resources, only a handful of researchers have explored it with respect to disk I/O schedulers and none of them have used it for adaptive I/O scheduling.

The referenced shortcomings in solving the problem are not intended to be exhaustive, but rather are among many that tend to impair the effectiveness of previously known techniques concerning I/O scheduling algorithms. However, those mentioned here are sufficient to demonstrate that the methodologies appearing in the art have not been satisfactory and that a significant need exists for the techniques described and claimed in this disclosure.

Fair queuing disk schedulers presented by previous researchers require detailed performance models of the disk system and/or models to estimate the seek delay and rotation delay for each I/O request. Constructing such models is difficult for a single drive, let alone for multi-drive disk arrays that are commonplace. In addition, although these schedulers are purported to be fair, they fail to provide I/O performance isolation, making them less attractive for adaptive I/O scheduling. Here I/O performance isolation means that the I/O behavior of one application does not affect the I/O performance of other applications.

Therefore to meet the quality of service needs of requests generated to a storage system from multiple applications with different data-delivery requirements, we need a flexible disk service allocation algorithm. This algorithm needs to allow different application-specific algorithms, each supporting the I/O requests of a different application class, to co-exist and provide fair allocation of disk service among these algorithms. In addition, this mechanism also should allow the addition of new application-specific algorithms so that many other requirements can be satisfied.

SUMMARY OF THE INVENTION

Embodiments of the present disclosure comprise a method for providing access to a storage system. In certain embodiments, the method comprises: (a) receiving a plurality of requests from a plurality of applications for access to the storage system; (b) assigning each application to one of a plurality of queues; (c) calculating an initial quanta for each queue; (d) selecting a first queue to access the storage system so that a request from the first queue can be serviced by the storage system; (e) calculating a subsequent quanta for the first queue after the request from the first queue has been serviced by the storage system; (f) determining if the subsequent quanta for the first queue is greater than or less than a predetermined value; (g) selecting the first queue to access the storage system if the subsequent quanta for the first queue is greater than the predetermined value, so that a subsequent request from the first queue can be serviced by the storage system; and (h) selecting a second queue to access the storage system if the subsequent quanta for the first queue is less than the predetermined value, so that a request from the second queue can be serviced by the storage system.

In specific embodiments, steps (c) through (g) are repeated until the subsequent quanta for the first queue is less than the predetermined value. Embodiments may also comprise: (i) calculating a subsequent quanta for the second queue after the request from the second queue has been serviced by the storage system; (j) determining if the subsequent quanta for the second queue is greater than or less than the predetermined value; (g) selecting the second queue to access the storage system if the subsequent quanta for the second queue is greater than the predetermined value, so that a subsequent request from the second queue can be serviced by the storage system; and (h) selecting the first queue to access the storage system if the subsequent quanta for the second queue is less than the predetermined value, so that a request from the first queue can be serviced by the storage system. In certain embodiments, the predetermined value is zero.

In some embodiments, the subsequent quanta for the first queue is less than the predetermined value by a specific amount in a round, and the specific amount is subtracted from the subsequent quanta for the first queue in a subsequent round. In specific embodiments, the subsequent quanta for the second queue is less than the predetermined value by a specific amount in a round, and the specific amount is subtracted from the subsequent quanta for the second queue in a subsequent round. In certain embodiments, each of the applications has a weight and the initial quanta calculated for each queue is based on the weight of the application. In specific embodiments, the plurality of requests for access to the storage system are received concurrently. In some embodiments, the step of selecting the first or second queue to access the storage system is independent of the time required to service requests from the first or second queue and is not required for the queue selection.

In certain embodiments, allocating an available service time to each of the requests is controlled by a virtual input/output scheduler for coarse-grain allocation and a plurality of application-dependent schedulers for fine-grain allocation. In specific embodiments, the virtual input/output scheduler allocates service time to each of the requests in a round-robin fashion. In some embodiments, a service time for the first queue to access the storage system does not affect the service time for the second queue to access the storage system.

Embodiments may also include a method comprising: receiving a plurality of requests for access to the storage system; receiving a plurality of priorities for each of the requesting applications; calculating a quanta for each of a plurality of queues; selecting a queue to access the storage system; calculating the quanta left after the selected queue accesses the storage system; selecting a next queue for access to storage; and utilizing a virtual input/output scheduler and a plurality of application-dependent schedulers to allocate a first portion of the available service time to the first request and to allocate a second portion of the available service time to the second request.

In certain embodiments, the first portion and the second portion are in proportion to an assigned weight for each of the queues. In some embodiments, the step of selecting a queue to access the storage system is independent of the time required to service its requests and is not required for the queue selection. In specific embodiments, the first queue has a request to obtain a first amount of data, the second queue has a request to obtain a second amount of data, and each queue has its own application-specific scheduler. In certain embodiments, the virtual input/output scheduler allocates service to the first and second queues in a round-robin fashion.

In some embodiments, a service time calculation for the first request for access to the storage system does not affect a service time calculation for the second request for access to the storage system.

Embodiments may also include a method comprising: receiving a plurality of requests from a plurality of applications for access to the storage system; receiving a plurality of weights for each of the requesting applications; and assigning each application to one of a plurality of queues. Embodiments may also comprise receiving from a first application a first request for storage access to a storage system; receiving from a second application a second request for storage access to the storage system; and determining a bandwidth of the storage system; determining a size for the first request. Embodiments may also comprise determining a size for the second request; determining a service time to satisfy the first request; and determining a service time to satisfy second request. Embodiments may also comprise allocating a first portion of bandwidth to the first request and allocating a second portion of the bandwidth to the second request. In certain embodiments, the allocating of the first and second portions of bandwidth can be based on the determined sizes and service times.

In certain embodiments, the service time for the first queue for access to the storage system does not affect the service time for the second queue for access to the storage system. In specific embodiments, the allocated first portion and second portion of the service times are in proportion to the weights for the applications associated with the first request and the second request. In some embodiments, the plurality of requests for access to the storage system are received concurrently and serviced concurrently. In certain embodiments, allocating the first portion and second portion of the service time can be controlled by a virtual input/output scheduler for coarse-grain allocation and a plurality of application-dependent schedulers for fine-grain allocation. In specific embodiments, the virtual input/output scheduler allocates service time to the first and second requests in a round-robin fashion.

In one respect, the present disclosure provides an adaptive I/O scheduling framework that is fair in sharing I/O system resources among multiple applications that are concurrently generating I/O requests and facilitates adaptivity by allowing each application to be serviced by a scheduler that is tailored to satisfy its data-delivery requirements. The framework may include at least two core components: an application-independent Virtual I/O Scheduler (VIOS) that controls the coarse-grain allocation of disk time and a set of application-dependent schedulers that determine the fine-grain interleaving of requests from the corresponding applications and, thus, allows the coexistence of multiple schedulers. The present disclosure may show that due to the disk-time fairness in the framework it (a) may maintain I/O performance isolation in such a way that the I/O characteristics of any application may not impact the I/O system performance of another; (b) provides performance virtualization because of the provided I/O performance isolation and applications may be given the impression that a fraction of the I/O system is dedicated to each one of them; (c) is work-conserving, thus, the I/O system may not be kept idle if there is pending work; and (d) can be extended to enforce strict Quality of Service (QoS) objectives. These characteristics make the framework suitable for next-generation operating systems and storage systems.

In other respects, the present disclosure provides to each of multiple applications a share of the storage service and provides deterministic Quality of Service guarantees to the applications in terms of latency, bandwidth, and service time of the storage system.

The term "coupled" is defined as connected, although not necessarily directly, and not necessarily mechanically.

The terms "a" and "an" are defined as one or more unless this disclosure explicitly requires otherwise.

The term "substantially," "about," and its variations are defined as being largely but not necessarily wholly what is specified as understood by one of ordinary skill in the art, and in one non-limiting embodiment, the term "substantially" and its variations refer to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

The invention and the various features and advantageous details are explained more fully with reference to the non-limiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
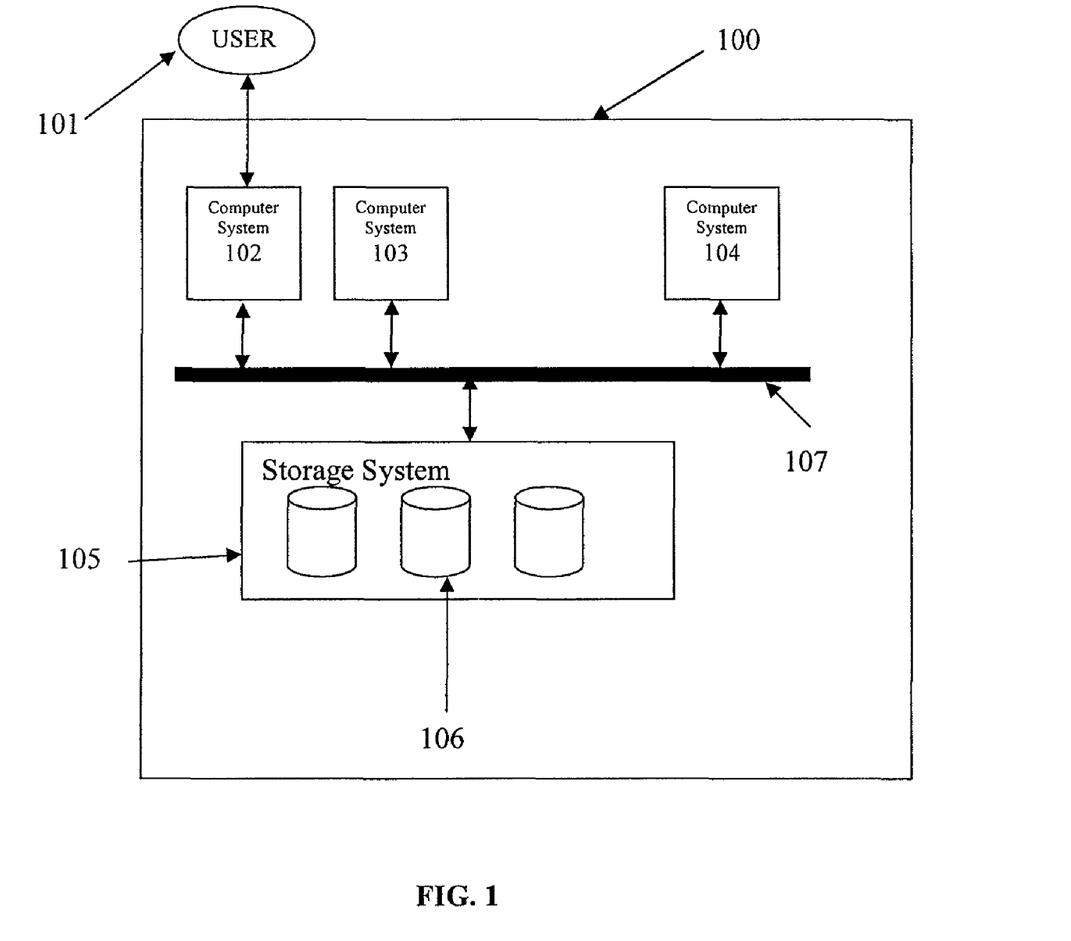
FIG. 1 is a diagram of a computer system with multiple computers and their associated storage system.

FIG. 1 depicts a diagram of a data processing system in which illustrative embodiments may be implemented. In this illustrative example, data processing system 100 includes the plurality of computer systems 102, 103, 104, a communications fabric 107, which provides for communications between the systems, e.g., 101, persistent storage unit 105, and input/output (I/O) storage devices 106.

Figure 2:
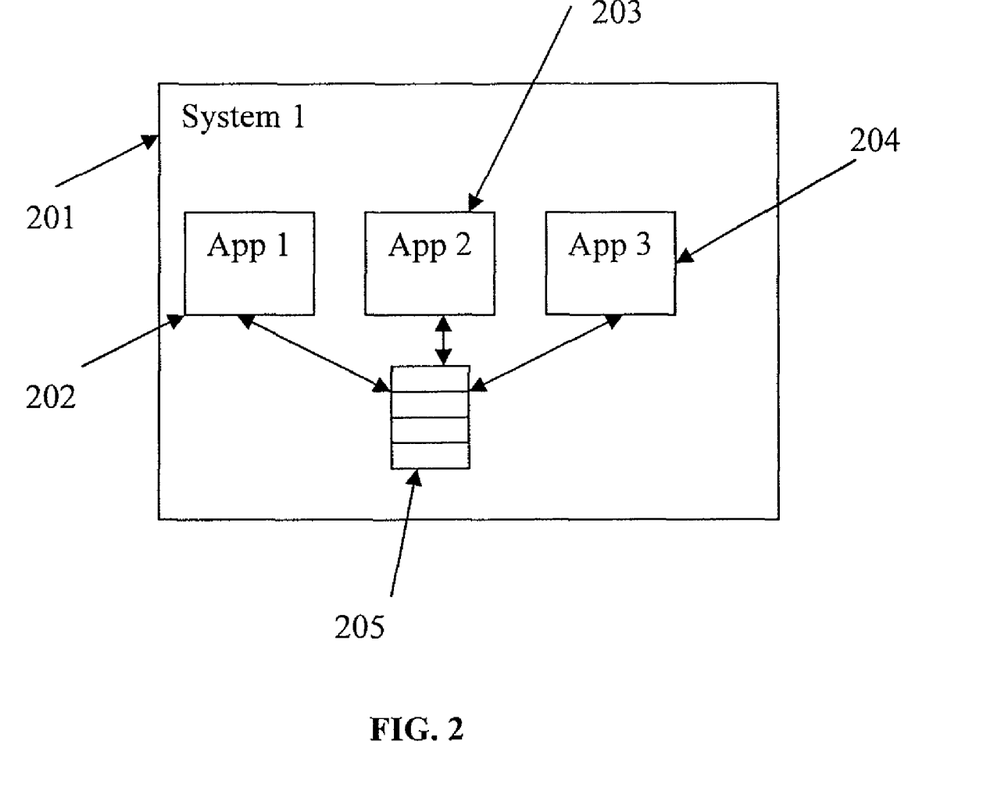
FIG. 2 shows a computer with multiple applications and a queue for their I/O requests.

As shown in FIG. 2, each of the computer systems 201 consists of the plurality of applications 202, 203, 204. Application 202 needs access to the storage system so it generates one or more I/O requests and these requests are enqueued in queue 205. All other applications in system 201 that need data from the same storage may enqueue requests in 205. Thus, queue 205 is shared by the different applications. Requests from different applications may have different priorities.

Figure 3:
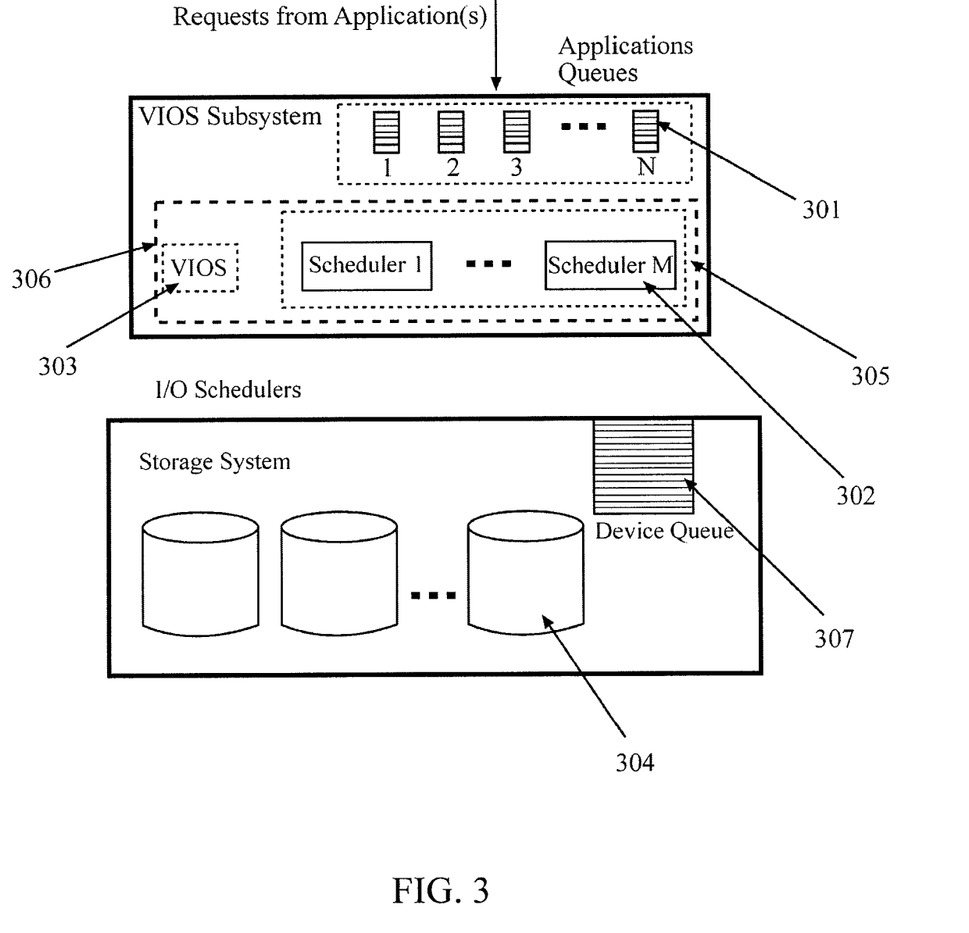
FIG. 3 is a schematic of an adaptive I/O scheduling framework, in accordance with embodiments of this disclosure.

As shown in FIG. 3, requests from different applications 202, 203, 204 (shown in FIG. 2) and different computer systems 102, 103, 104 (shown in FIG. 1) are put in different queues 301. Each queue in 301 belongs to a different application 202, 203, 204. In addition, each queue 301 may have its own request dispatch algorithm or scheduler 302 to storage 304. In this environment, exemplary embodiments of a Virtual I/O Scheduler (VIOS) 303 of this invention and the framework 306 can be used in any environment for fair sharing I/O storage system 105 (shown in FIG. 1). These facilitate application I/O service by allowing each application 202, 203, 204 to be serviced by a scheduler 302 that is tailored to satisfy its data-delivery requirements. Storage system 304 may have a device 307 which is an internal queue in the system. When device 307 is available on a storage system 304, it is desirable to schedule multiple requests from multiple queues to improve performance.

The framework may include at least two core components: an application-independent Virtual I/O Scheduler (VIOS) 303 that controls the coarse-grain allocation of disk time and a set of application-dependent schedulers 305 that determine the fine-grain interleaving of requests from the corresponding applications and, thus, allows the coexistence of multiple schedulers. Due to the disk-time fairness provided by the framework, the VIOS (a) maintains I/O in such a way that the I/O characteristics of any application may not impact the I/O system performance of another; (b) provides performance virtualization because of the provided I/O performance isolation and each application is given the impression that a fraction of the I/O system is dedicated to it; (c) is work-conserving, thus, the I/O system is not kept idle if there is pending work; and (d) can be extended to enforce strict Quality of Service (QoS) objectives. These characteristics make the framework suitable for next-generation operating systems and storage systems. The VIOS is particularly suitable in storage systems, operating systems, and storage devices, where a number of different applications share a common storage system or device for their I/O operations.

The present disclosure provides an Adaptive I/O Scheduling Framework that facilitates adaptivity of I/O schedulers and provides fair shares of I/O system resources to applications. The adaptivity provided by the framework is in terms of providing a suitable I/O scheduler for each concurrently-executing application to service its I/O requests; the choice of scheduler is based on the application's data-delivery requirements. The framework may include two core components: an application-independent Virtual I/O Scheduler (VIOS) that controls the coarse-grain allocation of disk time and a set of application-dependent schedulers that determine the fine-grain interleaving of requests from the corresponding applications.

Thus, the framework in its simplest form includes the VIOS and a set of schedulers, working together as described below:

At the start time, an I/O phase of each concurrently executing application, based on the application's data-delivery requirements, one of a set of I/O schedulers available in the system is chosen.

Thereafter, the chosen scheduler takes care of the 'order' in which I/O requests are dispatched from the application's I/O request queue.

The VIOS, which may be considered the scheduler of schedulers, allocates disk access to concurrently executing applications (schedulers). The Completely Fair Queuing with the Compensated Round Robin (CFQ-CRR) algorithm described with respect to FIG. 4 and FIG. 5 may be used by the VIOS in order to achieve fair disk-time allocation among competing applications.

An embodiment of the present disclosure may provide disk-time fairness and (a) it maintains I/O performance isolation in such a way that the I/O characteristics of any application may not impact the I/O performance of another; (b) it provides I/O performance virtualization because of the provided I/O performance isolation and applications are given the impression that a fraction of the I/O system is dedicated to each one of them; (c) it is work-conserving, thus, the I/O system is not kept idle if there is pending work; and (d) it can be extended to enforce strict Quality of Service (QoS) objectives. These characteristics make the framework suitable for contemporary and next-generation operating systems and storage systems.

In one respect, the storage system may be accessed by multiple concurrently executing applications, each requiring a fraction of the storage performance. In certain embodiments, explicit specification of the fractions is based on Quality of Service (QoS) objectives. In the absence of QoS objectives, applications may share the total resource equally. In either case, the sum of the fractions of storage performance required by all the applications is one. Next, the adaptive I/O scheduling framework is described in more detail.

The adaptive I/O scheduling framework has three objectives. First, it should provide fairness with respect to these fractions of storage performance. Second, it should provide I/O performance isolation such that one application cannot impact the I/O performance of another application. Third, each application may have its own I/O scheduling algorithm to satisfy its particular data-delivery requirements.

The adaptive I/O scheduling framework achieves the above three objectives with two core components: the VIOS 303 and a set of application-dependent schedulers 305. A schematic representation of the framework is shown in FIG. 3. At the coarser granularity, the VIOS 303 provides virtual slices of the shared I/O resource to the different applications in a round-robin fashion. At the finer granularity, during each of an application's slices, its scheduler 302 determines the 'order' in which I/O requests are dispatched from its request queue. The former provides fairness and I/O performance isolation across the different applications, while the latter aligns service with application data-delivery requirements. Traditionally, the above queuing mechanism is called fair queuing and the scheduling mechanism is called round-robin scheduling.

Advantages of the adaptive I/O scheduling framework include fairness in disk resource sharing, disk performance isolation through the allocation of virtual slices of the storage system to applications, and the scheduling of the multiple I/O schedulers to meet different application data-delivery requirements. The remainder of this disclosure describes the underlying algorithm with regard to FIG. 3, FIG. 4, and FIG. 5.

In the description the following terms: $q_1, q_2, \ldots, q_n$, represent the different queues of n applications, one queue per application. Assume that all application classes generate I/O requests to a single storage system. The quanta $Q_i$ is the disk service allocated to queue $q_i$. The quantum is a constant for a queue in each round, but its value may depend on the weight given to the queue. For example, a queue that has twice the weight gets twice the quantum. A detailed description of the assignment of weights may be assigned by a system administrator to satisfy QoS objectives or may be computed based on process priorities at run-time. The quanta may be disk time or number of bytes that could be serviced or the amount of bandwidth that could be serviced. For example, in one embodiment the quantum can be the disk time that is allocated to a queue.

In one embodiment, the algorithm used in the VIOS may provide disk-time fairness and I/O performance isolation, and account for heterogeneous request sizes as well as differences in disk seek and rotational times associated with different requests. Such an algorithm compensates for excess time allocated to an application class in subsequent rounds. This algorithm is designated the CFQ-CRR, Completely Fair Queuing with Compensating Round-Robin, scheduler.

The algorithm may not require knowledge of the seek and rotational characteristics of the disk system and it does not estimate the time required to satisfy requests of different sizes. CFQ-CRR treats the disk system as a black box and uses feedback information from request responses to compensate for associated delays.

Figure 4:
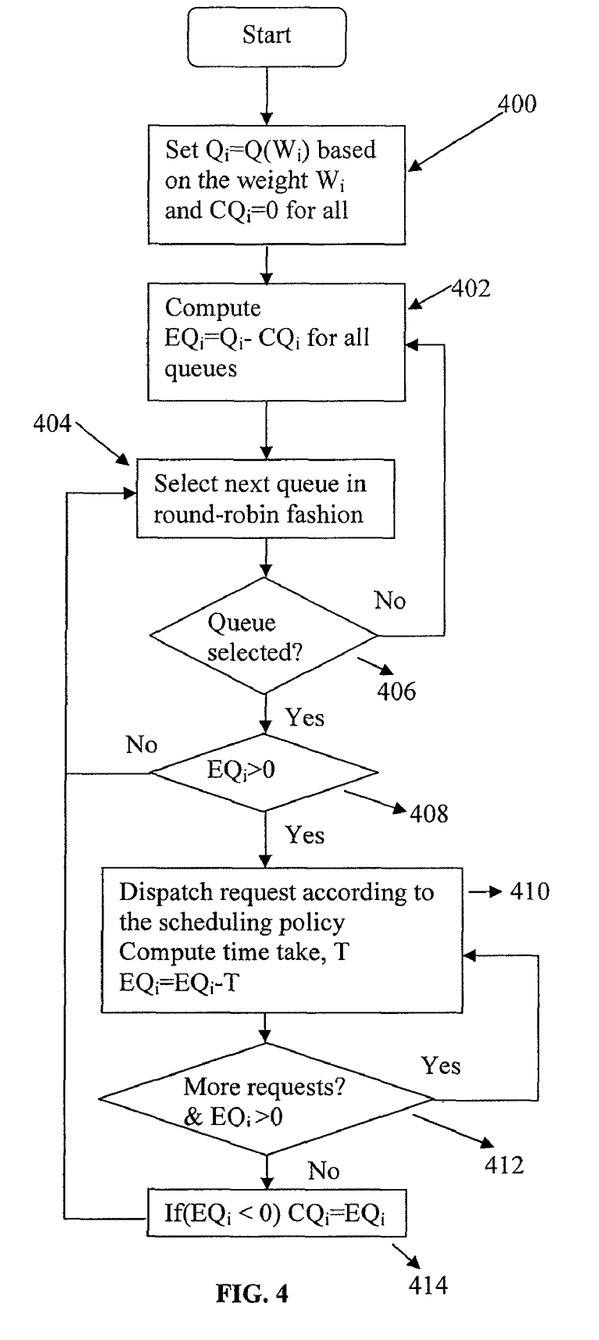
FIG. 4 is a flow diagram of an illustrative embodiment of the VIOS algorithm of the present invention.
Figure 5:
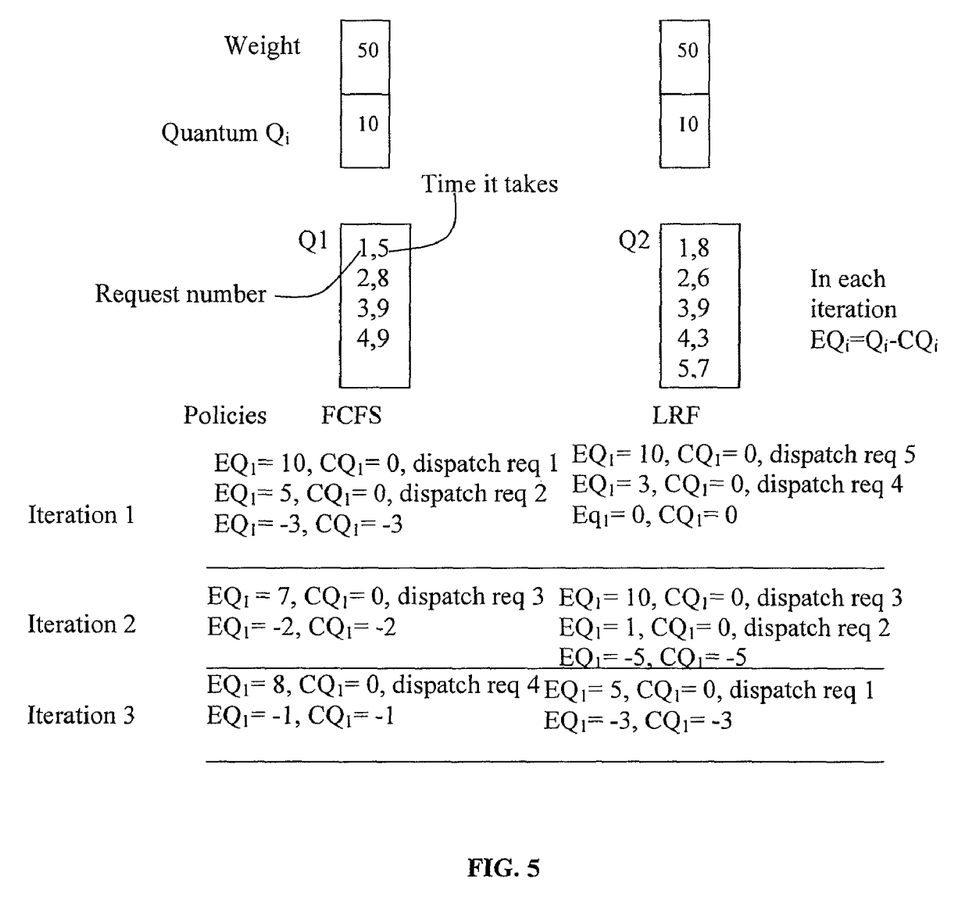
FIG. 5 shows an exemplary working behavior of VIOS on two queues; each queue has its own queue-specific scheduling algorithm.

The Completely Fair Queuing and Compensating Round-Robin (CFQ-CRR) Scheduler of the VIOS is now described with respect to FIG. 4 and FIG. 5. FIG. 3 shows the flow diagram of an illustrative embodiment of the CFQ-CRR in VIOS algorithm. At the beginning of a round of scheduling, a quantum Q of disk service time is assigned to each of the active queues. Then requests from a busy queue are scheduled one by one until the queue's quantum is exhausted. When a request is scheduled, its service time is subtracted from the queue's quantum. When the remaining quantum is less than or equal to zero, no more requests are scheduled from the queue. In the next round of scheduling, a negative quantum from the previous round is added to the quantum for this round. In this way, the algorithm keeps track of the extra time taken by requests of any queue and compensates for it in succeeding rounds.

CFQ-CRR Algorithm

This section presents the Compensating Round-Robin algorithm to schedule I/O requests to a disk system as shown in FIG. 4. Let $w_i = Q_i$ be the weight assigned to queue $q_i$, where $Q_i$ is the corresponding disk time consumed by $q_i$ during a round of scheduling. Also, since the algorithm works in cycles, each cycle of the algorithm shall be designated a round. The weights and the quanta calculation is done in 400 of FIG. 4. At the beginning, the compensating quantum $CQ_i=0$ for all queues.

Queue $q_i$ is allowed to dispatch requests in a round as long as its effective request service time $EQ_i$ for the round is greater than 0. Effective quantum $EQ_i$ is computed at the end of each round-robin cycle in step 402 based on the original quantum $Q_i$ and compensating quantum $CQ_i$. After the computation, a queue is picked in step 404 using the round-robin algorithm. At the end of the round-robin cycle, $EQ_i$ is recomputed in step 402. Step 406 determines if the cycle is complete or not. The engine in step 408 determines if the queue has any effective quantum left for dispatching requests. If there is no remaining positive effective quantum, the next queue will be selected in step 404. Step 410 dispatches a request according to the scheduling policy of the application associated with the queue and after the request is serviced, it computes the queue's remaining effective quantum. At step 412, a check is performed to ascertain if the queue contains requests and if the queue has a positive remaining effective quantum. If the queue has a positive remaining effective quantum and the queue contains requests, step 410 schedules the next request. If the remaining effective quantum is negative, the remaining effective quantum will become the compensating quantum in step 414. In disk scheduling, when a request dispatched during a round causes the aggregate service time associated with a queue to exceed its assigned quantum, the dispatched request cannot be preempted in the middle of its service. The extra disk time, above the assigned quantum, utilized by the request is called the Compensating Quantum $CQ_i$. So, as an embodiment of the invention, in the next round, the assigned $Q_i$ is shortchanged by the $CQ_i$ of the previous round.

Consider that each of the queues has a First-Come-First-Serve (FCFS) scheduler for dispatching their requests. In this context, FCFS is the application-dependent scheduler. The VIOS allocates a quantum Q to each queue and uses CFQ-CRR to distribute the disk time across queues, and each of queues uses FCFS (the default scheduler) to schedule its requests. Since scheduling may be performed in general-purpose operating systems, all processes have equal weights for I/O, i.e., $w_i=w$ $(0 \leq i < n)=Q$ may be assumed.

Referring now to FIG. 4 and FIG. 5, a more through description of the VIOS process with shows an example of the process with two queues. Both queues are assigned the same weight and, hence, their initial quantum Q=10 is the same. Referring to FIG. 4, the initial quantum is computed in step 400 based on the weights. In the example of FIG. 5, queue 1 requires the First-Come-First-Serve (FCFS) scheduling policy, thus, the requests are serviced in the order 1, 2, 3, 4. Queue 2 requires the Last Request First (LRF) scheduling policy, thus, referring to FIG. 4, using step 410, the requests from this queue are serviced in the order 5, 4, 3, 2, 1. In FIG. 5 a queue entry shows the request number and the time the request takes. This time is shown for illustration purposes only; in reality this time is not known. Exemplary embodiments do not use this time for the scheduling. Again, referring to FIG. 4, step 402 computes the effective quanta for both queues before Iteration 1. FIG. 5 shows the effective quanta $EQ_i$ and the compensating quanta $CQ_i$ in each round and for each scheduled request. In Iteration 1, at step 404 (FIG. 4), queue 1 is selected in the round-robin fashion because it is the first queue. Step 408 determines that $EQ_1$ is greater than 0—it is 10—thus, it goes to step 410. In this step, request 1 is dispatched because of the FCFS policy; after it is serviced, the service time T=5 is subtracted from $EQ_1$ making it 5. At step 412, since there are requests in the queue and $EQ_1$ is larger than zero, control goes to step 410. The process is repeated for request 2 and $EQ_1$ becomes −3. This $EQ_1$ is assigned to $CQ_1$ and control goes to step 404. In step 404, queue 2 is selected and the process is repeated for it. In step 410, queue 2's requests are selected using the LRF scheduling policy, whereas requests in queue 1 are selected using FCFS. So, in step 410, request 5 is dispatched first from queue 2. This process is repeated for all queues and for all requests.

Given the example of FIG. 5 and the control flow diagram of FIG. 4, it can be seen that the VIOS framework provides an innovative Adaptive I/O Scheduling Framework that facilitates adaptivity of I/O schedulers and provides fair shares of I/O system resources to applications. One example of the adaptivity provided by the framework is in terms of the servicing of each concurrently-executing application by a suitable I/O scheduler, which is chosen based on its data-delivery requirements. The framework includes two core components: an application-independent VIOS that controls the coarse-grain allocation of disk time and a set of application-dependent schedulers that determine the fine-grain interleaving of requests from the corresponding applications. The VIOS provides for fairness without the need to identify the size of the requests or the time they may take for service.

The example provided above allowed only one request to be dispatched to the disk at any time. As shown in FIG. 3 storage system 304 that may have internal queueing 307, it is desirable to schedule multiple requests from multiple queues to improve performance. It is rather straightforward to extend VIOS to take care of this case. We present a simple extension of VIOS below.

To take advantage of device queuing, in each round of round-robin service, the VIOS should allow each application-dependent scheduler to dispatch multiple requests from each busy queue, such that the requests take approximately the allocated quantum of disk time. To determine the number of requests needed to do this, an approximation of the number of requests that can be scheduled in a given quantum may be needed. The approximation should be such that the number of requests scheduled takes no less than the given quantum of disk time and also takes only a bounded amount of time over the allocated quantum. These two objectives can be achieved by using the maximum bandwidth obtainable from the disk system as a reference point. Let Q be the quantum of disk time allowed in milliseconds, and BW be the maximum obtainable bandwidth of the disk system in MB/s. Then the number of bytes that can be scheduled from the queue is (Q·BW)=1000 MB≈2·Q·BW sectors (assuming that each sector is 512 bytes). From this, a scheduler can easily schedule requests from its queue such that the sum of the sectors scheduled is equal to or slightly greater than the above number. Notice that the scheduled requests take Q or longer disk time, but not smaller than Q, because the estimation is based on the maximum bandwidth. Let BW be the maximum obtainable bandwidth and K be the number of requests that can be outstanding at the device queue 307 (FIG. 3). In Linux, the device queue depth can be measured from the sys file system; for other operating systems, this can be gleaned from other locations. For each busy queue $q_i$, the corresponding scheduler:

1. Computes the total number of sectors to be serviced: $SQ_i = 2 \cdot Q_i \cdot BW$.
2. Dispatches requests from queue $q_i$ as long as the sum of sectors of the dispatched requests is less than $SQ_i$ and the total number of pending requests in the driver queue is less than K.
3. If there are no more requests in queue $q_i$ and the number of pending requests is less than K, go to step 1 and repeat the process for queue $q_i+1$; else continue to step 4.

4. Once the number of pending requests reaches K, only begin dispatching requests again when there are two pending requests. The reason for this heuristic is explained later.
5. When all the schedulers that are allowed to reorder requests have completed their round, the VIOS takes over the scheduling responsibility.
6. The VIOS calculates the compensating quantum $CQ_i$, allocates the quanta $Q_i$ for the next round, and applies round-robin scheduling for all busy queues with positive quanta.

In one embodiment, the device queue 307 may be kept full all of the time. In another embodiment, the device queue 307 may not be refilled until there are only a small number of requests, for example, two requests. This may be done to avoid starvation of requests in the device queue. This is because command queuing reorders the outstanding requests to minimize disk-head seek movement using a scheduler like Shortest Seek First (SSF). Thus, if the device queue is continuously filled and the incoming requests are for sectors closer to the current head position, then requests that require larger seeks or rotations of the head will be delayed indefinitely. Thus, when the disk system is loaded heavily, the disk head localizes itself to a particular location and may result in request starvation.

Techniques of this disclosure may be accomplished using any of a number of programming languages. For example, techniques of the disclosure may be performed on a computer readable medium. Suitable languages include, but are not limited to, BASIC, FORTRAN, PASCAL, C, C++, C#, JAVA, HTML, XML, PERL, etc. An application configured to carry out the invention may be a stand-alone application, a network-based application, or a wired or wireless Internet-based application to allow easy, remote access. The application may be run on a personal computer, a data input system, a point-of-sale device, a PDA, a cell phone, or any computing mechanism.

Computer code for implementing all or parts of this disclosure may be housed on any processor capable of reading such code as known in the art. For example, it may be housed on a computer file, a software package, a hard drive, a FLASH device, a USB device, a floppy disk, a tape, a CD-ROM, a DVD, a hole-punched card, an instrument, an ASIC, firmware, a "plug-in" for other software, web-based applications, RAM, ROM, etc. The computer code may be executable on any processor, e.g., any computing device capable of executing instructions according to the methods of the present disclosure. In one embodiment, the processor is a personal computer (e.g., a desktop or laptop computer operated by a user). In another embodiment, the processor may be a personal digital assistant (PDA), a cellular phone, or other handheld computing device.

In some embodiments, the processor may be a networked device and may constitute a terminal device running software from a remote server, wired or wireless. Input from a source or other system components may be gathered through one or more known techniques such as a keyboard and/or mouse, and particularly may be received from an image device, including but not limited to a camera and/or video camera. Output may be achieved through one or more known techniques such as an output file, printer, facsimile, e-mail, web-posting, or the like. Storage may be achieved internally and/or externally and may include, for example, a hard drive, CD drive, DVD drive, tape drive, floppy drive, network drive, flash, or the like. The processor may use any type of monitor or screen known in the art, for displaying information. For example, a cathode ray tube (CRT) or liquid crystal display (LCD) can be used. One or more display panels may also constitute a display. In other embodiments, a traditional display may not be required, and the processor may operate through appropriate voice and/or key commands.

All of the methods disclosed and claimed herein can be executed without undue experimentation in light of the present disclosure. While the methods of this disclosure may have been described in terms of preferred embodiments, it will be apparent to those of ordinary skill in the art that variations may be applied to the methods and in the steps or in the sequence of steps of the method described herein without departing from the concept, spirit, and scope of the disclosure. All such similar substitutes and modifications apparent to those skilled in the art are deemed to be within the spirit, scope, and concept of the disclosure as defined by the appended claims.

REFERENCES

Each of the following references is hereby incorporated by reference in its entirety.

Alvarez et al., *ACM Trans. Comp. Sys.*, 19(4):483-518, 2001.
Anderson et al., In: *Hippodrome: Running Circles around Storage Administrators*, Proceed. Conf. File Storage Tech. (FAST), 175-188, California, 2002.
Axboe, In: *Linux Block IP—Present and Future*, Proc. Ottawa Linux Symp., Canada, 51-61, 2002.
Bhattacharya et al., In: *Asynchronous I/O Support in Linux 2.5*, Proc. Ottawa Linux Symp., Canada, 371-386, 2003.
Bruno et al., In: *Disk Scheduling with Quality of Service Guarantees*, Proc. IEEE Internatl. Conf. Multimedia Computing Sys., II:400-405, 1999.
Demers et al., In: *Analysis and Simulation of a Fair Queuing Algorithm*, proc. SIGCOMM Symp. Commun. Arch. Protocols, Texas, 1-12, 1989.
Golestani, In: *A Self-Clocked Fair Queuing Scheme for Broadband Applns.*, Proc. IEEE INFOCOM, Canada, 636-646, 1994.
Goyal et al., In: *Start-time Fair Queuing: a Scheduling Algorithm for Integrated Service Packet Switching Networks*, ACM SIGCOMM Comp. Comm. Rev., 26(4):157-168, 1996.
Greenberg and Madras, *J. ACM*, 39(3):568-598, 1992.
Hofri, *Commun. ACM*, 23(11):645-653, 1980.
Huffman and Clark, In: *Serial ATA: Native Command Queuing—An Exciting New Perform. Feature for Serial ATA*, by Intel Corp. and Seagate Tech., 2003.
Jin et al., In: *Interposed Proportional Sharing for a Storage Service Utility*, Proc. ACM Sigmetrics, New York, 2004.
Love, *Linux Kernel Develop.*, Sams Publishing, 2004.
Love, *Linux J.* 2004(118):10, 2004.
Lumb et al., In: *Façade: Virtual Storage Devices with Performance Guarantees*, Proc. Conf. File and Storage Tech. (FAST), CA, 131-144, 2003.
Marr et al., *Intel Tech. J.*, 6(1):4-15, 2002.
Marushak and Jeppsen, In: *Deciding between SATA and SAS*, Storage Networking Work Online, 2004.
McKenney, *Research and Exp.*, 2:113-131, 1991.
Seelam et al., In: *Fairness and Performance Isolation: an Analysis of Disk Scheduling Algorithms*, High Performance I/O Techniques and Deployment of Very Large Scale I/O Systems (HiperIO), Barcelona, Spain, 2006.
Shreedhar and Varghese, *IEEE/ACM Trans. Networking*, 4(3):375-385, 1996.
Shenoy and Vin, *Real-Time Systems*, 22(1-2):9-48, 2002.

Tan and Guttag, In: *Time-based Fairness Improves Performance in Multi-rate WLANS*, Proc. USENIX Ann. Tech. Conference, Massachusetts, 2004.

Toby and Pinkerton, *Commun. ACM*, 15(3):177-194, 1972.

Wijayarante and Reddy, *Multimedia Systems*, 8(1):57-68, 2000.

Zanussi et al., In: *Relayfs: an Efficient Unified Approach for Transmitting Data from Kernel to User Space*, Proc. 2003 Linux Symp., Canada, 2003.

Zhang et al., In: *Storage Performance Virtualization via thrughput and Latency Control*, Proc. Intl. Symp. Modeling, Analysis Simul. Comp. Telecomm. Sys. (MASCOTS), 2005.

Seetharami Seelam, Towards Dynamic Adaptation of I/O Scheduling in Commodity Operating Systems, Dissertation, 2006.

Seetharami Seelam, Patricia Teller, In: Virtual I/O Scheduler: An Adaptable Scheduler of Schedulers for Performance Virtualization, Proc of the ACM/Usenix Intl. Conference on Virtual Execution Environments, 2007.

The invention claimed is:

1. A method for providing access to a storage system, the method comprising:
   (a) receiving a plurality of requests from a plurality of applications for access to the storage system;
   (b) assigning each application to one of a plurality of queues;
   (c) calculating an initial quanta for each queue;
   (d) selecting a first queue to access the storage system so that a request from the first queue can be serviced by the storage system;
   (e) calculating a subsequent quanta for the first queue after the request from the first queue has been serviced by the storage system;
   (f) determining if the subsequent quanta for the first queue is greater than or less than a predetermined value;
   (g) selecting the first queue to access the storage system if the subsequent quanta for the first queue is greater than the predetermined value, so that a subsequent request from the first queue can be serviced by the storage system; and
   (h) selecting a second queue to access the storage system if the subsequent quanta for the first queue is less than the predetermined value, so that a request from the second queue can be serviced by the storage system, where allocating an available service time to each of the requests is controlled by a virtual input/output scheduler for coarse-grain allocation and a plurality of application-dependent schedulers for fine-grain allocation.

2. The method of claim 1 wherein steps (c) through (g) are repeated until the subsequent quanta for the first queue is less than the predetermined value.

3. The method of claim 2 further comprising:
   (i) calculating a subsequent quanta for the second queue after the request from the second queue has been serviced by the storage system;
   (j) determining if the subsequent quanta for the second queue is greater than or less than the predetermined value;
   (g) selecting the second queue to access the storage system if the subsequent quanta for the second queue is greater than the predetermined value, so that a subsequent request from the second queue can be serviced by the storage system; and
   (h) selecting the first queue to access the storage system if the subsequent quanta for the second queue is less than the predetermined value, so that a request from the first queue can be serviced by the storage system.

4. The method of claim 3 wherein the subsequent quanta for the first queue is less than the predetermined value by a specific amount in a round, and wherein the specific amount is subtracted from the subsequent quanta for the first queue in a subsequent round.

5. The method of claim 3 wherein the subsequent quanta for the second queue is less than the predetermined value by a specific amount in a round, and wherein the specific amount is subtracted from the subsequent quanta for the second queue in a subsequent round.

6. The method of claim 1 wherein the predetermined value is zero.

7. The method of claim 1 wherein each of the applications has a weight and the initial quanta calculated for each queue is based on the weight of the application.

8. The method of claim 1, where the plurality of requests for access to the storage system are received concurrently.

9. The method of claim 1, where the virtual input/output scheduler allocates service time to each of the requests in a round-robin fashion.

10. The method of claim 1, where a service time for the first queue to access the storage system does not affect the service time for the second queue to access the storage system.

* * * * *